United States Patent [19]

Coffinberry

[11] Patent Number: 5,137,230
[45] Date of Patent: Aug. 11, 1992

[54] AIRCRAFT GAS TURBINE ENGINE BLEED AIR ENERGY RECOVERY APPARATUS

[75] Inventor: George A. Coffinberry, West Chester, Ohio

[73] Assignee: General Electric Company, Cincinnati, Ohio

[21] Appl. No.: 709,851

[22] Filed: Jun. 4, 1991

[51] Int. Cl.$^5$ ................. B64D 13/00; B64D 33/00
[52] U.S. Cl. ..................... 244/118.5; 244/53 R; 244/58; 98/1.5; 60/39.142; 60/39.07
[58] Field of Search ............ 244/118.5, 207–209, 244/53 R, 53 B, 134 R, 134 B, 117 A, 58; 98/1.5; 62/87; 60/39.142, 39.07

[56] References Cited

U.S. PATENT DOCUMENTS

| | | | |
|---|---|---|---|
| 2,777,301 | 1/1957 | Kuhn | 244/118.5 |
| 2,833,492 | 5/1958 | Fowler | 244/209 |
| 3,024,624 | 3/1962 | Morley et al. | 244/118.5 |
| 3,317,162 | 5/1967 | Grant | 244/42 |
| 3,428,242 | 2/1969 | Rannenberg | 230/116 |
| 3,711,044 | 1/1973 | Matulich | 244/118 |
| 3,878,677 | 4/1975 | Colvin | 60/39.14 |
| 3,887,147 | 6/1975 | Grieb | 244/208 |
| 3,951,360 | 4/1976 | Anxionnaz | 244/42 |
| 4,193,262 | 3/1980 | Snell | 60/261 |
| 4,261,416 | 4/1981 | Hamamoto | 244/118.5 |
| 4,419,926 | 12/1983 | Cronin et al. | 98/1.5 |
| 4,482,114 | 11/1984 | Gupta et al. | 244/134 |
| 4,503,666 | 3/1985 | Christoff | 60/39.07 |
| 4,523,517 | 6/1985 | Cronin | 98/1.5 |
| 4,642,997 | 2/1987 | Kafka | 62/87 |
| 4,749,150 | 6/1988 | Rose et al. | 244/53 |
| 4,993,663 | 2/1991 | Lahti et al. | 244/53 |

FOREIGN PATENT DOCUMENTS

| | | |
|---|---|---|
| 0065855 | 5/1982 | European Pat. Off. |
| 0076668 | 4/1983 | European Pat. Off. |
| 585341 | 9/1942 | United Kingdom |
| 743598 | 4/1953 | United Kingdom |
| 744923 | 5/1954 | United Kingdom |
| 774695 | 4/1955 | United Kingdom |
| 846358 | 6/1958 | United Kingdom |
| 1530330 | 1/1976 | United Kingdom |
| 2027874 | 2/1980 | United Kingdom |
| 2074654 | 4/1980 | United Kingdom |
| 2076897 | 12/1981 | United Kingdom |
| 2127492 | 6/1983 | United Kingdom |

*Primary Examiner*—Galen Barefoot
*Attorney, Agent, or Firm*—Jerome C. Squillaro

[57] ABSTRACT

An environmental control system for supplying aircraft or cabin air to an aircraft is provided with a propulsive engine compressor bleed supply means and an ECS bleed air flow control means which includes an energy recovery means for using the unrequired or unused energy to pump boundary layer air from the surface of the aircraft, such as from the engine nacelle, and exhaust this air rearward of the engine to produce thrust, thus returning some of this unused energy to the propulsive engine.

4 Claims, 3 Drawing Sheets

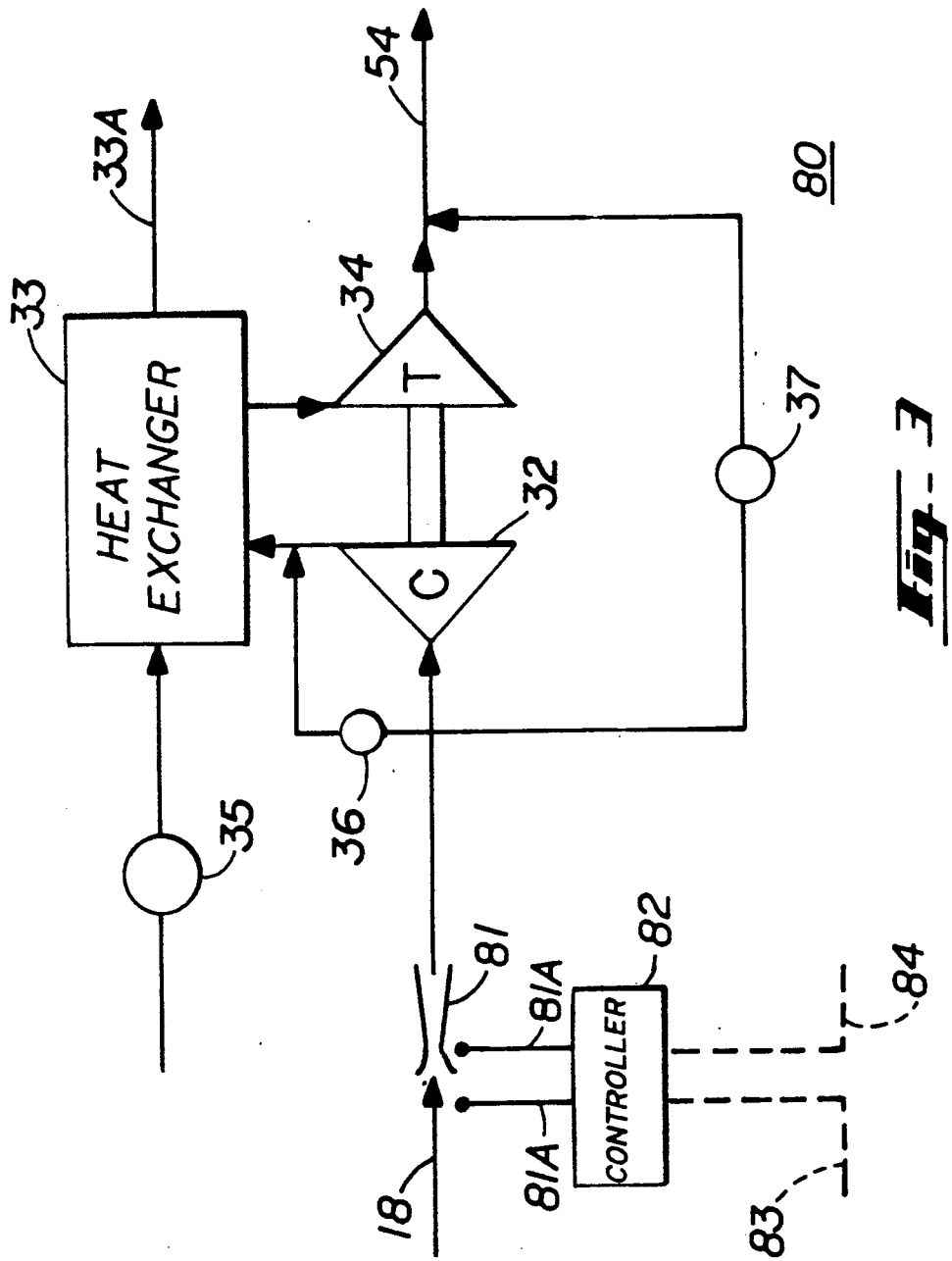

AIRCRAFT GAS TURBINE ENGINE BLEED AIR ENERGY RECOVERY APPARATUS

BACKGROUND OF THE INVENTION

1. Field of the Invention

The invention relates to aircraft environmental control systems powered by gas turbine engines for supplying aircraft system bleed air. In particular, the invention relates to an aircraft gas turbine engine powered bleed air supply system for an aircraft environmental control system wherein the excess pressure energy is returned to the engine to improve fuel efficiency and the system is also used to reduce drag on engine nacelles or other surfaces by pumping boundary layer air.

2. Description of Related Art

Environmental control systems, commonly referred to as ECS systems, incorporate various pieces of equipment such as turbocompressors, regulating valves, heat exchangers, and other apparatus including what is referred to as an ECS pack to condition engine bleed air. Modern day jet aircraft use turbocompressors in the ECS packs of their environmental controls systems to condition bleed air for use in the cabin wherein the turbocompressors are powered by the same bleed that is conditioned for cabin refreshing air and which is usually supplied by the gas turbine engines which provide aircraft propulsion. Other ECS systems employ auxiliary power units (APU's) that are separate gas turbine engines, not use for propulsion, to power ECS packs as well as other aircraft equipment.

Bleed air is conventionally taken from the engine compressor at a stage downstream of the variable vane compressor stages so as not to interfere with the operation of the variable vane stages which greatly enhance the efficiency of the gas turbine engine and greatly reduces the specific fuel consumption (SFC) of the engine. The compressor bleed air is cooled by fan air in a heat exchanger conventionally referred to as a precooler and is then delivered to the environmental control system for controlling cabin air freshness, pressure, and temperature. The ECS conventionally includes two or more ECS packs mounted in ECS bays on different sides of the aircraft which receive compressor bleed air from the engines. The bleed after being used to power the ECS pack and refresh the cabin is then dumped overboard. All the energy remaining in the bleed air dumped overboard cost fuel and therefore represents a significant loss in specific fuel consumption.

Extraction of aircraft bleed air from the engine compressor has adverse affects on the propulsion cycle and engine life. Engine turbine power is needed to compress air and account for compressor inefficiency. Therefore, extra fuel consumption is always associated with gas turbine engine compressor bleed air (air which does not produce thrust). This extra fuel burned in the engine combustor results in higher gas temperature delivered to the engine turbine and reduction of turbine blade life. Such penalties must be incurred in order that the engine turbine provide extra power associated with bleed air.

It is not possible, without undue complexity, to always bleed the engine compressor stage which provides exactly the correct pressure needed for the aircraft anti-ice and ECS systems. Typically, only two bleed ports are provided. Therefore, the result is to bleed air which exceeds minimum pressure requirements resulting in even higher penalty to the engine cycle than would be required by the aircraft systems.

Most often the bleed air is not only at a higher than required pressure, it is also too hot. For reasons of fire safety, maximum bleed air temperature is usually limited to 350° to 500° F. Temperature control requires cooling the bleed air with a precooler. Most modern engines use fan air to cool compressor bleed air. Use of fan air imposes an additional penalty on fuel consumption. Further, the precooler is usually large and requires a fan air scoop which produces drag. A typical large turbofan engine will consume about 2% extra fuel and run at about 20° F. hotter turbine temperature in order to provide aircraft system bleed air. The present invention addresses these problems and deficiencies characteristic of the prior art and conventional apparatus used to supply aircraft bleed air.

FIG. 1 schematically illustrates an environmental control system (ECS) typical of the prior art having a conventional compressor bleed supply system 10 which extracts compressor bleed air from an aircraft propulsive gas turbine engine compressor section 8 to flow to and power a conventional ECS pack 30, which is depicted using an air cycle refrigeration system to cool and condition compressor bleed air, as is typical of the prior art. Compressor bleed supply system 10 includes a compressor mid-stage air bleed port 11 and a compressor discharge air bleed port 12 for supplying compressor bleed air through a compressor bleed air line 9. Bleed air normally flows through mid-stage bleed check valve 13 to shut-off valve 14. At low engine power, discharge bleed valve 15 can be opened, causing check valve 13 to close and bleed air to be delivered from compressor discharge port 12 to shut-off valve 14. Bleed air pressure is reduced to a duct structurally safe level by pressure regulator valve 16. Bleed air passes through engine bleed air precooler 17, which cools compressor bleed air, using cooler fan air from engine fan 19, to a safe temperature level before passing through duct 18 which is typically located in the aircraft wing near the aircraft fuel tanks. Fan cooling air from engine fan 19 flows through a precooler temperature control valve 21 upstream of precooler 17 and downstream of precooler 17 fan air is then flowed overboard of the engine as indicated by arrow 17a.

Having been partially reduced in both pressure and temperature, engine bleed air passes through duct 18 to ECS pack 30 for further temperature and pressure adjustment before introduction to aircraft 50 including its cabin, cockpit, and cargo bays as required. ECS flow control valve 31 drops bleed pressure substantially so that the pressure losses across ECS pack 30 maintains the desired bleed flow from the engine to the aircraft. The pressure losses across ECS pack 30 and in particular flow control valve 31 are very expensive in terms of fuel and thrust because of the energy spent compressing the bleed air.

A portion of the bleed flow passes through an ECS refrigeration compressor 32 to a ram air heat exchanger 33 then to an ECS refrigeration turbine 34. ECS refrigeration compressor 32 and ECS refrigeration turbine 34 are supplied as a single ECS turbocompressor assembly wherein ECS refrigeration compressor 32 is a centrifugal compressor and ECS refrigeration turbine 34 is a radial inflow turbine. The pressure drop across ECS refrigeration turbine 34 causes it to drive ECS refrigeration compressor 32.

Heat is removed from the bleed air by heat exchanger 33 which receives cooling air from a conventional ram air scoop 35a located on an outside surface of the aircraft and controlled by a ram air door 35. Ram cooling air is then dumped overboard as indicated by arrow 33a. Other portions of the bleed air bypasses ECS refrigeration compressor 32 through compressor bypass valve 36 or ECS pack bypass 37. ECS pack bypass air from valve 37 mixes with bleed air from ECS refrigeration turbine 34 for final temperature control of conditioned ECS bleed supply air that is supplied to aircraft 50 through an ECS air supply line 54.

Conditioned bleed air then flows to aircraft 50 for passenger flesh air consumption, cabin pressurization and temperature control. Temperature control is required to counter a varying cabin heat load 51 that includes aircraft skin cooling, solar heating, passenger body heating and electrical load heating. Part of cabin supply air 52 returns through re-circulation fans 53 and mixes with conditioned ECS bleed supply air from ECS air supply line 54. Cabin pressure is controlled by an outflow valve 55 that dumps overboard, as indicated by arrow 55a. Air flow from outflow valve 55 is essentially compressor bleed air taken from engine compressor section 8 and supplied to the aircraft.

Another problem addressed by the present invention relates to aerodynamic drag associated with engine nacelles, wings, pylons, tail sections and other aircraft outer surfaces. As air flows on to and over a surface such as an engine nacelle and aircraft wing it progressively builds up a low velocity boundary layer of increasing thickness. Within this boundary later a portion of the velocity component of free stream total pressure is converted to increased static pressure. As the result of rise in static pressure, boundary layer thickness, and diffusion a point is reached where back pressure causes an otherwise laminar boundary layer to become turbulent. In the turbulent region, a considerable amount of total pressure is converted to static temperature represented thermodynamically as an increase in entropy. By the time the boundary layer leaves the surface, or in the particular case of an aircraft gas turbine engine, the end of the nacelle, an unrecoverable loss in total pressure has occurred. The large entropy rise associated with turbulence is at the expense of air momentum. Turbulence also gives rise to increased static pressure which may increase the intensity of rearward acting pressure force on the surface. Now, if the boundary layer thickness is kept small, separation and turbulence will not occur or will be delayed and drag can be substantially reduced.

It is well known that one way to avoid increases or to reduce the build up in boundary thickness is to pump or bleed off boundary layer air through holes in the aircraft wetted surfaces such as the wing, tail, or portions of the engine nacelle. Boundary layer pumps or compressors would be desirable from an aerodynamic standpoint but, because of the relatively large airflow rates and added weight and complexity associated with effective boundary layer pumping or bleeding, the concept has not been adapted in modern aircraft and engines. Therefore, in one embodiment of the invention, this invention provides a means for effectively and economically using engine compressor bled air to power a nacelle boundary layer bleed compressor to bleed off laminar flow boundary layer air from the nacelle to reduce drag.

A similar problem was addressed in, and reference may be made to, patent application Ser. No. 07/531,718, invented by George A. Coffinberry, filed Jun. 1, 1990, and assigned to the same assignee and incorporated herein by reference.

Mechanically powered means for reducing boundary layer drag of various aircraft parts such as wings, nacelles, and aircraft tail assemblies have been proposed in the past and in patent application Ser. No. 07/489,150 entitled "*AIRCRAFT ENGINE STARTER INTEGRATED BOUNDARY BLEED SYSTEM*", invented by Samuel Davison, filed Mar. 6, 1990 and assigned to the same assignee. Other inventions addressing this problem are disclosed in a patent application Ser. No. 07/531,718 entitled "*GAS TURBINE ENGINE POWERED AIRCRAFT ENVIRONMENTAL CONTROL SYSTEM AND BOUNDARY LAYER BLEED*", filed on Jun. 1, 1990, and a patent application Ser. No. 07/572,825 entitled "*AIRCRAFT ENGINE ELECTRICALLY POWERED BOUNDARY LAYER BLEED SYSTEM*", filed on Jun. 1, 1990, both invented by the same inventor of this patent and assigned to the same assignee, both incorporated herein by reference.

Another patent application Ser. No. 07/531,734 entitled "*GAS TURBINE ENGINE FAN DUCT BASE PRESSURE DRAG REDUCTION*", invented by the same inventor of this patent, filed on Jun. 1, 1990, and assigned to the same assignee, and incorporated herein by reference, discloses a mechanically powered means of bleeding boundary layer air and reducing the drag of the aircraft by introducing at least a portion of the pressurized bleed air into the fan duct of the engine to reduce the base drag of the duct.

SUMMARY OF THE INVENTION

Briefly, in accordance with one aspect of the present invention, an environmental control system for supplying aircraft or cabin air to an aircraft powered by a gas turbine engine is provided with a propulsive engine compressor bleed supply means and an ECS air flow control means which includes an energy recovery means for returning the unrequired or unused amount of energy back to the engine. The ECS flow control and energy recovery means includes an air turbine powered by bleed air from the compressor bleed supply means and is mechanically linked in driving relationship to an auxiliary compressor that pumps boundary layer air from the surface of the engine nacelle and exhausts this air rearward of the engine to produce thrust.

The air turbine includes a variable inlet nozzle and a means to control it which is in switchable fluid supply communication with sources of gas turbine engine compressor bleed air and provided with a means for ducting its exhaust flow to the environmental control system ECS pack. The ECS pack includes a means for producing a signal that is provided to a variable inlet control means for controlling the variable inlet turbine nozzle.

ADVANTAGES

Among the advantages provided by the present invention is the ability to eliminate waste of fuel and thrust such as that incurred in dropping the pressure of propulsive engine bleed air by ECS pack flow control valves. The present invention provides a more efficient aircraft gas turbine engine by using the energy in the compressor bleed air that is conventionally wasted.

Another advantage of the present invention is that it allows the use of a lighter weight and more efficient and longer life aircraft gas turbine engine.

The present invention's use of boundary layer air to precool compressor bleed air has the further advantage of eliminating a need for a drag producing fan cooling air scoop and reduces the size and weight required for the precooler.

By using the otherwise wasted energy of compressor bleed air to drive the boundary layer suction compressor the present invention is able to reduce engine nacelle boundary layer drag in a fuel efficient manner. Furthermore, this advantage can be optimized because boundary layer drag is a penalty that accumulates over the cruise portion of the flight envelope and is therefore an easy point to design for.

These advantages and other features and advantages will become more readily apparent in the following description when taken in conjunction with the appended drawings.

BRIEF DESCRIPTION OF THE DRAWING

The foregoing aspects and other features of the invention are explained in the following description, taken in connection with the accompanying drawing where:

FIG. 3 is a schematic representation of an energy conserving ECS pack for use with the ECS of FIG. 2 in accordance with the preferred embodiment of the present invention.

DETAILED DESCRIPTION OF THE INVENTION

Figure 2:
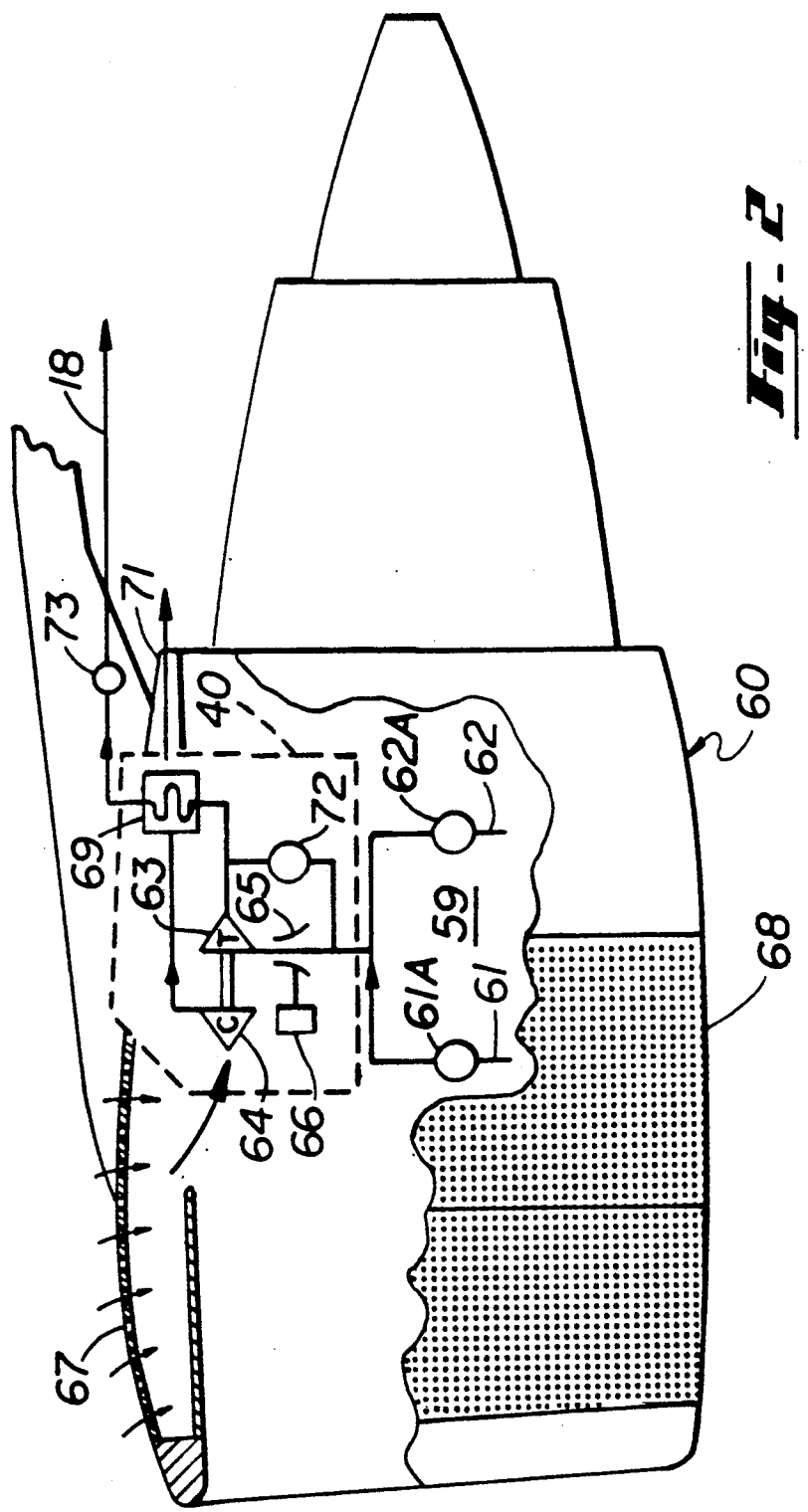
FIG. 2 is a schematic representation of an aircraft propulsive gas turbine engine boundary layer bleed system for an aircraft propulsive gas turbine engine powered environmental control system (ECS) in accordance with the preferred embodiment of the present invention.

The present invention provides an ECS having an energy recovering compressor bleed flow control means 40 as illustrated in FIG. 2. Schematically illustrated in FIG. 2 is compressor bleed flow control means 40 used to control the flowrate of compressor bleed flow through duct 18 in FIG. 2 to an energy conserving ECS pack 80 of FIG. 3 which is in accordance with the preferred embodiment of the present invention.

FIG. 2 schematically illustrates a part of an ECS including a compressor bleed supply means 59 that is partially controlled by compressor bleed flow control means 40 to supply compressor bleed air to energy conserving ECS pack 80 in FIG. 3 through duct 18. Compressor bleed supply means 59 includes a mid-stage bleed port 61 and a compressor discharge bleed port 62 that bleed compressed air from corresponding stations in the compressor sections of an aircraft propulsive gas turbine engine 60 and are controlled by mid-stage and compressor discharge bleed control valves 61A and 62A respectively. Compressor bleed supply means 59 supplies compressor bleed air to compressor bleed flow control means 40 that also serves as an energy recovery means that uses a portion of an unrequired or unused amount of energy to reduce boundary layer drag and return another portion of this unused amount of energy back to engine 60 in form of thrust.

The energy recovery means includes an air turbine 63 drivenly connected through a shaft to a boundary layer bleed compressor 64. Air turbine 63 is preferably a single stage radial inflow turbine having a variable area turbine inlet nozzle 65. Turbine nozzle actuation means 66 receives a signal 83 from aircraft energy conserving ECS pack energy conserving 80 of FIG. 3 and opens and closes its exhaust area so as to vary and control the amount of bleed air taken from either mid-stage bleed port 61 or compressor discharge bleed port 62. Variable area turbine nozzle 65 converts a portion of its supply pressure to high velocity air appropriately directed on to the inlet of air turbine 63. Air turbine 63 converts this high velocity air to power which drives boundary layer bleed compressor 64.

Figure 1:
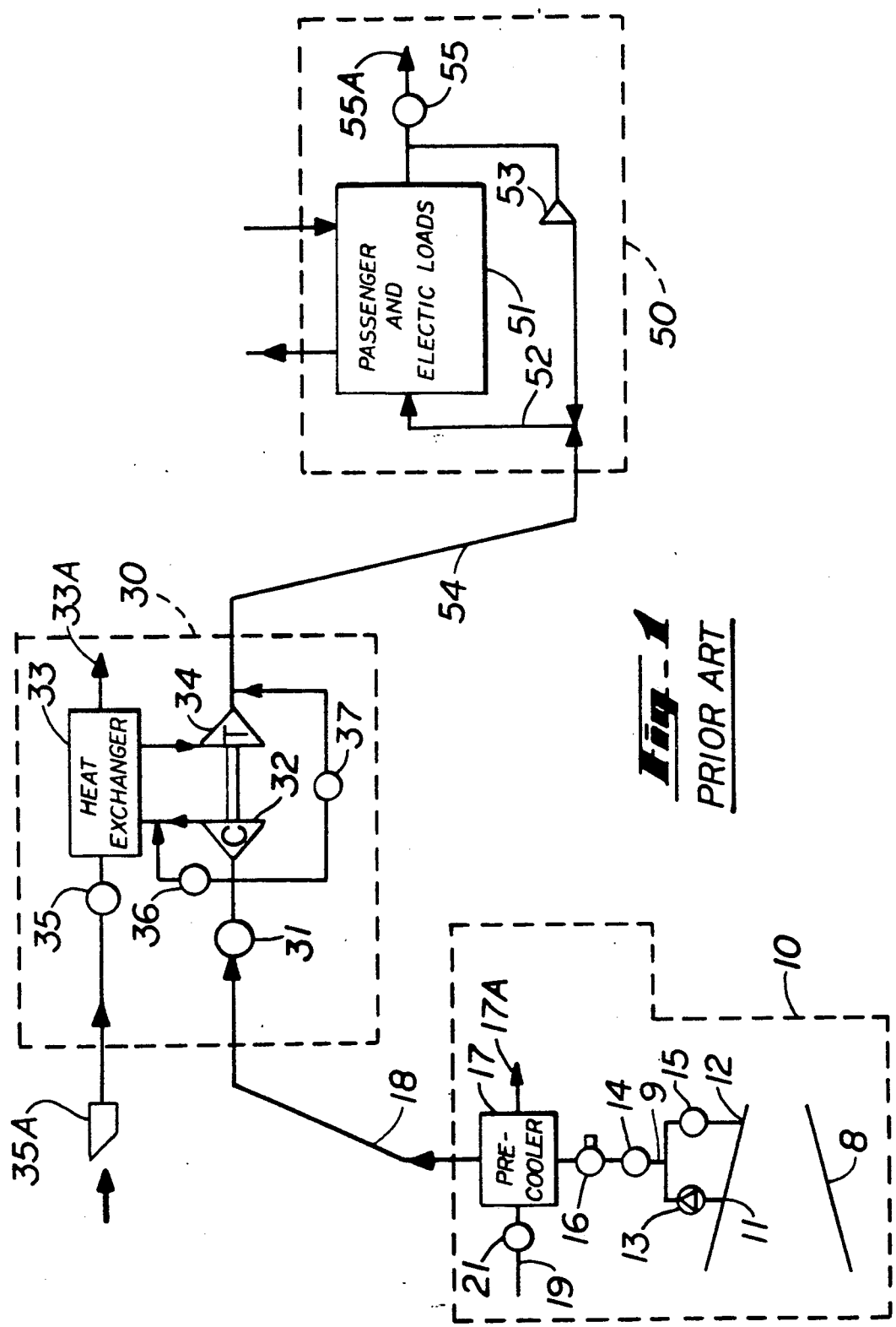
FIG. 1 is a schematic representation of a prior art ECS system for supplying engine bleed air to an ECS pack and conditioning it for use in an aircraft.

The drop in pressure from engine bleed port 61 or 62 is thus converted to compressor drive energy while at the same time the amount of bleed air taken from the engine is controlled by varying turbine nozzle area. In a conventional prior art bleed air arrangement, as shown in FIG. 1 and described previously, comparable pressure drop would be simply throttled by ECS flow control valve 31 in FIG. 1 and energy would be lost.

Boundary layer bleed compressor 64 pumps air through engine nacelle suction holes 67 from an aircraft wetted surface represented in the preferred embodiment by a nacelle surface 68. Removal of boundary layer air through suction holes 67 prevents build up of a thick region of boundary layer stagnation and transition to turbulence, thus maintaining laminar flow over nacelle surface 68 and reduction in nacelle surface frictional drag. Reduction in drag permits engine 60 to be operated at a lower level of thrust and therefore burn less fuel.

Boundary layer suction air from compressor 64 flows to a precooler heat exchanger 69 where it cools and in return is heated by engine bleed air leaving turbine 63 for delivery to energy conserving ECS pack 80 in FIG. 3 through duct 18 for eventual use by aircraft 50 as what is commonly referred to as cabin air.

Higher temperature boundary layer suction air then flows to thrust nozzle 71 where it exhausts at a velocity the same or slightly higher than aircraft flight velocity. So long as the amount of suction air does not exceed an amount which would cause an increase in free stream penetration into the stagnation region associated with the laminar boundary layer, the ram drag penalty, due to change in momentum of the boundary layer air that is suctioned off, is essentially zero. Therefore, essentially all of the momentum associated with air leaving nozzle 71 is available as positive thrust. Therefore, energy derived from turbine 63 is returned to the engine in the form of both drag reduction and thrust increase.

For conditions in which the demand of bleed air exceeds the capacity of nozzle 65 or turbine 63, bleed air may bypass turbine 63 through a bypass valve 72. Overpressure valve 73 provides overpressure protection and shutoff as in the case of a conventional system.

Precooler heat exchanger 69 replaces fan precooler 17 of a conventional prior art ECS system (shown in FIG. 1) and is relatively small since compressor 64 requires less pressure ratio than the engine fan and therefore results in colder air into the cold side of the heat exchanger. Turbine 63 cools engine bleed air by work extraction before the bleed air reaches heat exchanger 69. After leaving heat exchanger 69, the bleed air is substantially colder than it would be for a conventional prior art ECS system using precooler 17 shown in FIG. 1.

FIG. 3 schematically illustrates an energy conserving ECS pack 80 in accordance with the preferred embodiment of the present invention for use with energy recovering compressor bleed flow control means 40 as described above with the previous discussion. A flow sensor 81 is used to measure the amount of bleed air flowed from the engine compressor through duct 18. A controller 82 receives a flowrate signal through flow rate signal lines 81a and then sends an appropriate control signal 83 to turbine nozzle area actuator 66, as shown in FIG. 2, in response to a demand signal 84 received from the aircraft and the flowrate signal.

In order to reduce the bleed air supply pressure to the ECS pack and thereby provide more power to turbine 63 of FIG. 2, bypass valve 37 is opened to a maximum extent, thus reducing the amount of flow and associated pressure drop through the rest of energy conserving ECS pack 80. This extra degree of bypass is made possible by the fact that the invention described previously by FIG. 2 provides colder air to energy conserving ECS pack 80.

The remainder of ECS pack bleed air flows either through ECS refrigeration compressor 32 or compressor bypass valve 36. ECS refrigeration compressor 32 must be bypassed through valve 36 when there is insufficient pressure drop across ECS refrigeration turbine 34 to power ECS refrigeration compressor 32.

Ram air door 35 opens to provide ram air cooling air to heat exchanger 33 and proper temperature control of compressor bleed air passing through ECS bypass valve 37, compressor bypass valve 36, and ECS refrigeration compressor 32. The compressor bleed air then passes through ECS air supply line 54 to aircraft 50 (as shown in FIG. 1). Components and arrangement of energy conserving ECS pack 80 that are essentially the same as those in the conventional ECS system illustrated as prior art in FIG. 1 are labeled with the same numerals.

The present invention provides a distinct advantage for improving specific fuel consumption by returning otherwise unused energy to the engine and using a variable area inlet nozzle turbine to drive a compressor for purposes of laminar flow suction, engine bleed air cooling and additional thrust from the suction air. An example of the magnitude of the advantage that can be realized from the present invention has been calculated based on the following typical aircraft configuration and operating conditions. A McDonnell-Douglas MD-11 aircraft having two General Electric CF6-80C2 engines, a 280-passenger load, and operating at a 35,000 foot cruising altitude at a point where each engine is conventionally operating at a thrust level of 7919 pounds. It has been calculated that for this typical configuration and these operating conditions that each of the two engines should have a 1.3% improvement in engine specific fuel consumption (SFC).

The present invention has been described in an illustrative manner. It is understood that the terminology which has been used is intended to be in the nature of words of description rather than of limitation. Unused engine bleed air energy in the form of pressure and temperature can be used to power a turbine and provide bleed airflow control, bleed air temperature reduction, and useful power such as to drive a laminar flow suction-air compressor. The same unused energy might also power an air ejector for suction flow or for other reasons. Turbine power might be used to drive a motor-driven compressor for the same advantages of the present invention or for other reasons. Obviously, these and many other modifications and variations of the present invention are possible in light of the above teachings. It is, therefore, to be understood that within the scope of the appended claims, the present invention may be practiced otherwise than as specifically described.

I claim:

1. An environmental control system (ECS) powered by an aircraft propulsive gas turbine engine having a compressor section, said ECS comprising:

a compressor bleed air means to bleed compressor bleed air form the compressor section of the gas turbine engine;

a compressor bleed flowrate control means in fluid supply communication with said compressor bleed air means for controlling the flowrate of compressor bleed air bled from the compressor of the propulsive gas turbine engine to an ECS bleed air refrigeration means, said compressor bleed flowrate control means including an energy recovery means comprising an energy extraction and work conversion means for converting the extracted energy to useful work, in fluid supply communication with said bleed air supplied by said bleed air means, said energy extraction means comprising an air turbine having a variable air turbine inlet for controlling the amount of bleed air admitted to said air turbine, a cabin air demand signal means connected to said controller, and a variable air turbine inlet controlled by a controller wherein said controller receives a flowrate signal from said flow sensor and controls the amount of bleed air admitted to said air turbine by controlling said variable air turbine inlet in response to cabin air demand signal received from said cabin air demand signal means.

2. An ECS as claimed in claim 1 wherein said energy recovery means comprises an air turbine powered by the compressor bleed air and said energy extraction and work conversion means comprises an auxiliary compressor drivenly connected to said air turbine.

3. An ECS as claimed in claim 2 further comprising a means for providing suction for an aircraft surface boundary layer bleed means wherein said means for providing suction includes said auxiliary compressor.

4. An environmental control system (ECS) powered by an aircraft propulsive gas turbine engine having a compressor section, said ECS comprising:

a compressor bleed air means to bleed compressor bleed air from the compressor section of the gas turbine engine, a compressor bleed flowrate control means in fluid supply communication with said compressor bleed air means for controlling the flowrate of compressor bleed air bled from the compressor of the propulsive gas turbine engine to an ECS bleed air refrigeration means, said compressor bleed flowrate control means including an energy recovery means comprising an energy extraction and work conversion means for converting the extracted energy to useful work, in fluid supply communication with said bleed air supplied by said bleed air means, wherein said energy recovery means comprises an air turbine powered by the compressor bleed air and said energy extraction and work conversion means comprises an auxiliary compressor drivenly connected to said air turbine, a means for providing suction for an aircraft surface boundary layer bleed means wherein said means for providing suction includes said auxiliary compressor, a controller connected to a flow sensor to measure the flowrate of bleed air from said air turbine to said ECS bleed air refrigeration mean, a cabin air demand signal means connected to said controller, and a variable air turbine inlet controlled by said controller wherein said controller receives a flowrate signal from said flow sensor and controls the amount of bleed air admitted to said air turbine by controlling said variable air turbine inlet in response to a cabin air demand signal received from said cabin air demand signal means.

* * * * *